Nov. 22, 1966   R. G. BOARD ETAL   3,287,062
RETRACTABLE SAFETY BELTS
Filed May 8, 1964
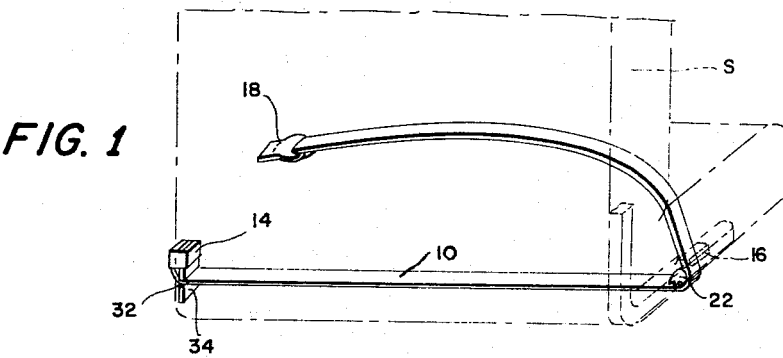
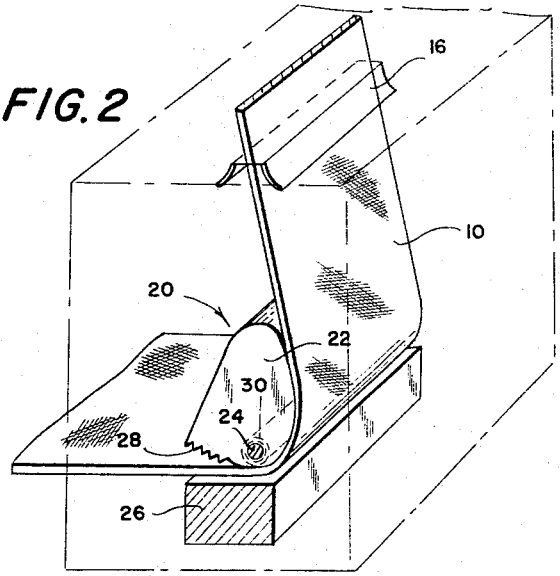
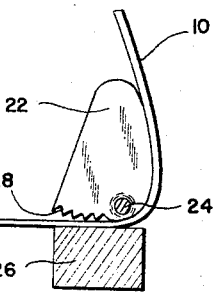
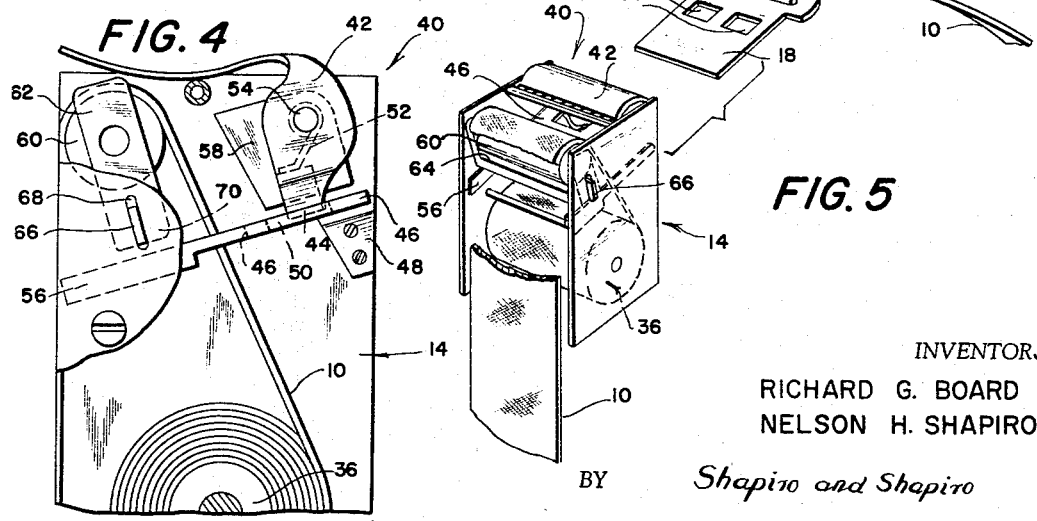
INVENTORS
RICHARD G. BOARD
NELSON H. SHAPIRO
BY  *Shapiro and Shapiro*
ATTORNEYS 3,287,062
RETRACTABLE SAFETY BELT
Richard G. Board, 3000 Connecticut Ave., Bethesda, Md., and Nelson H. Shapiro, Hyattsville, Md. (7001 Old Cabin Lane, Rockville, Md. 20852)
Filed May 8, 1964, Ser. No. 366,072
7 Claims. (Cl. 297—388)

This invention relates to retractable safety belts, and more particularly to so-called "seat belts" for use in automotive vehicles.

Retractable seat belts are described, for example, in the applicants' copending applications, Serial No. 273,696, filed April 17, 1963, Serial No. 298,914, filed July 31, 1963, Serial No. 313,948, filed October 4, 1963, Serial No. 319,847, filed October 29, 1963, and Serial No. 344,418, filed February 12, 1964.

Broadly speaking, the inventions described and claimed in the copending applications are concerned with apparatus which permits the extension of a seat belt to a user-restraining position, at which a fastener is engaged, and automatic retraction of the belt when the fastener is released. The belt is freely movable to and from its user-restraining position, yet when the fastener is engaged, further extensile movement of the belt is prevented regardless of the effective length of the belt.

Seat belts presently in use are made of a fabric such as nylon webbing. While such fabric is strong enough to withstand the usual collision forces, the webbing is capable of substantial elongation or stretching under heavy load. For example, the seat belt specifications provided by the Society of Automative Engineers prescribe a maximum percent elongation of twenty percent with twenty-five hundred pounds load. Thus, the longer the webbing employed in the belt, the greater the potential elongation in a collision.

While belts can be designed which have a minimum length of fabric, for example, a strip which merely extends across the lap of the user, in order to provide adjustability and suitable anchorages it is necessary to employ lengths of fabric much greater than the minimum. For example, in the aforesaid copending application Serial No. 298,914 a fully adjustable retractable seat belt is described in which the belt extends from side-to-side under or behind the seat and then across the lap of the user to form, in effect, a single loop for restraining the user. The effective belt length can be made approximately the same as with conventional two-piece floor-mounted belts, because the portions of the belt which normally would extend to the floor are eliminated in favor of the portion extending under or behind the seat. However, it is desirable to reduce the effective length of webbing subjected to elongation under collision forces.

It is accordingly a principal object of the present invention to provide, in a retractable seat belt or the like, apparatus for limiting the portion of the seat belt which is subjected to elongation or stretching.

Another object of the invention is to provide apparatus located along the path of extensile and retractile movement of a seat belt which ordinarily does not interfere with such movement but which automatically fixes an intermediate portion of the belt to a load-receiving support when the tension of the belt is appreciable and substantially greater than the tension created during the normal extensile and retractile movement of the belt.

A further object of the invention is to provide a retractable seat belt which is fixed against extensile movement, except for stretching or elongation, when a belt fastener is engaged to place the belt in user-restraining position and which has means intermediate the fastener and a belt retractor for clamping the belt to a load-receiving support when the belt tension reaches a value considerably greater than that encountered during normal extensile and retractile movement of the belt, thereby to limit the portion of the belt subject to elongation.

Still another object of the invention is to provide a retractable seat belt which, in user-restraining position, forms a substantially complete loop about the user and in which the portion of the loop subjected to stretching or elongation is limited.

Yet another object of the invention is to provide unique apparatus for fixing a seat belt or the like to a support at a point intermediate the ends of the belt when the belt is subjected to substantial tensile forces, the apparatus also serving to guide the belt if desired.

Briefly stated, but without intent to limit the scope of the invention, one embodiment of the invention utilizes a belt which extends from a receptacle at one side of a vehicle seat, under the seat, and through an outlet at the other side of the seat. The exposed end of the belt, which rests adjacent the outlet when the belt is fully retracted, is provided with a fastener which may be inserted in and releasably retained in the receptacle to place the belt in user-restraining position. A retractor, which may be located adjacent to the receptacle, retracts the belt automatically when the fastener is disengaged from the receptacle. Apparatus is provided at the receptacle for preventing extensile movement of the belt, except for stretching or elongation, when the fastener is retained in the receptacle. The receptacle may be permanently fixed to the seat frame, assuming that the seat will withstand collision forces, and in accordance with the invention the belt may be temporarily and automatically fixed to the frame adjacent to the outlet when the tension in the belt reaches a value substantially greater than the tension encountered in the normal extensile and retractile movement of the belt.

The foregoing and other objects, advantages, and features of the invention and the manner in which the same are accomplished will become more readily apparent from consideration of the following detailed description of the invention in conjunction with the accompanying drawings, which illustrate preferred and exemplary embodiments, and wherein:

FIGURE 1 is a perspective view of a seat belt installation in accordance with the invention, as seen from the rear, the seat being shown in phantom lines;

FIGURE 2 is a fragmentary perspective view illustrating a belt elongation-limiting apparatus of the invention in a first position;

FIGURE 3 is a fragmentary vertical sectional view illustrating the apparatus of FIGURE 2 in a second position;

FIGURE 4 is a fragmentary side elevation view illustrating one form of apparatus which may be employed to prevent normal extensile movement of the belt when the belt is placed in user-restraining position; and FIGURE 5 is a fragmentary perspective view further illustrating the apparatus of FIGURE 4.

Referring to the drawings, FIGURE 1 illustrates a retractable seat belt installation of the type described, for example, in the aforesaid copending Serial Numbers 298,914 and 313,948, wherein a seat belt 10 extends from a receptacle 14 at one side of the seat S, under the seat, and through an outlet 16 at the other side of the seat. It will be assumed that the seat and its anchorage to the floor of the vehicle have sufficient strength to withstand collision forces, although the invention may be employed in an installation in which the belt moves through guide means anchored directly to the floor, as described in the said Serial No. 298,914, for example.

The exposed end of the belt is provided with a fastener 18, for example an apertured metal tongue, which is adapted to be inserted and releasably retained within the receptacle 14. The belt, which may be formed of nylon webbing, for example, has its other end secured to a retractor to be described hereinafter. Fastener 18 is located adjacent to the outlet 16 when the belt is fully retracted but is too large to enter the outlet. The user grasps the fastener and draws the belt across his lap and then inserts the fastener into the recepatcle, where it is held automatically until released. As will become apparent hereinafter when the fastener is inserted in the receptacle, further extensile movement (except for stretching or elongation) is effectively prevented, and the belt forms a substantially continuous loop about the user. When the fastener is released from the receptacle, the retractor automatically retracts the belt and positions the fastener 18 adjacent the outlet 16.

Located preferably close to the outlet 16 is an apparatus 20, best seen in FIGURE 2, which normally permits free extensile and retractile movement of the belt but which fixes the belt to the frame of the seat (or to the floor in a floor-mounted installation) when the tension in the belt reaches a value substantially greater than that normally encountered in the usual extensile and retractile movement of the belt. In the form shown this apparatus comprises a clamp including a clamp lever 22 pivoted upon the frame by means of a pin 24 which may be supported by brackets (not shown) upon a frame member 26 of the seat. The lever or cam 22 has a roughened clamping surface 28 which is normally spaced away from the frame member 26, as shown in FIGURE 2, under the bias of a torsion spring 30 or other suitable bias means. In the illustrative form the lever normally serves as a belt guide, the belt extending between the clamping surface 28 and the frame member 26 and then passing around the lever to the outlet 16. Because the belt is bowed outwardly somewhat in passing around the curved vertical surface of the lever to the outlet 16, the belt tends to exert a force upon the lever, which if sufficient, would turn the lever counterclockwise in FIGURE 2 about the axis of the shaft 24. The surface of the lever which engages the belt in the normal position of the lever illustrated in FIGURE 2 is preferably smooth and contoured so as to minimize belt friction during normal extensile and retractile movement of the belt. The force of the spring which holds the lever in the normal position illustrated in FIGURE 2 is great enough so that the lever does not move under the influence of the normal extensile and retractile forces. Hence, the lever serves as a passive guide.

However, when the fastener 18 is inserted in the receptacle 14, so that further extensile movement of the belt is prevented, as will be described hereinafter, the belt is capable of exerting substantial forces upon the lever 22, which, if sufficient, will turn the lever to the position illustrated in FIGURE 3, so as to clamp the belt between the lever and the frame member 26. As will become apparent hereinafter, when the fastener 18 is inserted in the receptacle 14, the portion of the belt at the receptacle is effectively fixed to the frame of the seat. Thus, when lever 22 fixes the portion adjacent to outlet 16 to the frame of the seat, the only part of the belt which is subjected to elongation or stretching under the influence of collision forces is the part of the belt which extends across the lap of the user from the outlet 16 to the receptacle 14. Since the length of this part of the belt is relatively small, the elongation is greatly reduced.

To provide clamping action adjacent to the outlet 16 only when desired, it is merely necessary to use a bias spring for the lever 22 having an appropriate force. For example, if the tension created in the belt during extensile or retractile movement does not exceed ten pounds, the bias force is chosen so that the lever 22 will not turn until the tension reaches a substantially greater value, such as twenty-five or fifty pounds or even more. The spring force will of course be correlated with the effective length of the lever arm tending to turn the clamp and with the orientation of the belt relative to the lever arm, which determines the component of force exerted upon the lever arm when the belt is placed in tension. The clamping surface 28 may be curved as shown to assist the turning of the lever when the surface frictionally engages the tensioning belt.

As indicated above, it is desired to keep within reasonable bounds the friction exerted upon the belt during its normal extensile and retractile movement. For example, the belt adjacent to the receptacle 14 may pass through a smoothly contoured guide slot 32 in the frame member 34 of the seat, and the contour of the outlet 16 may be smoothly shaped to reduce friction. Also, as set forth in the aforementioned copending Serial Numbers 298,914 and 313,948, for example, suitable guide means, such as tubes or rollers may be employed to guide the movement of the belt.

It is not necessary, however, that the clamp lever 22 also serve as a belt guide or that it be placed in the location illustrated. For example, any suitable guide means, such as a roller, may be employed to guide the belt about the turn adjacent to the outlet 16. The elongation-limiting means may be located elsewhere, as between the outlet and the belt guide, and may comprise a different type of device which is actuated upon the attainment of a predetermined belt tension in order to fix the belt to a load-receiving support. Moreover, the automatic elongation-limiting apparatus of the invention may be employed in other types of seat belt installations wherein it is desired to fix an intermediate portion of the belt when the tension reaches a predetermined value. For example, within the broader aspects of the invention, a belt extending from an inertial reel may be fixed at a point intermediate the reel and a fastener after the reel has locked and the belt tension has increased to a predetermined value.

The means within the receptacle 14 for preventing extensile movement of the belt when the fastener 18 is inserted is not per se the present invention. Suitable means have been described, for example, in the aforesaid copending Serial Numbers 298,914 and 313,948. Such means permit initial extension of the belt to any degree required to accommodate the size and clothing of the user but prevent further extension (except for stretching) when the fastener 18 is inserted in the receptacle 14. Within the broader aspects of the invention, however, the stretch-limiting means may be utilized in an installation in which the belt is not automatically adjustable but must be fully withdrawn from the retractor for safety. It is highly desirable, however, that the belt be fully and automatically adjustable, and reference is therefore made to the aforesaid copending applications wherein appropriate apparatus is described and claimed. For purposes of the present description a typical apparatus, described an claimed in the said Serial No. 313,948, will now be set forth with reference to FIGURES 4 and 5.

As shown in FIGURE 4, the end of the belt remote from fastener 18 is associated with a retracting device, such as a spring-wound reel 36 supported for rotation in the housing or frame of the receptacle 14. The retracting device need not be a reel and need not be located within the confines of the receptacle. The tongue 18 may be of the well known type having one or more locking openings 38. The tongue is adapted to be received by a mating latch 40, which may be of the conventional type having a pivoting latch lever 42 provided with projections 44 adapted to enter the openings 38 in the tongue 18. A base plate 46 extends between the side walls of the receptacle housing and has ears 48 fixed to the respective side walls. The base plate has openings 50 aligned with the projections 44 and the openings 38 of the tongue when the tongue is inserted into the latch mechanism. Lever 42 is biased by a spring 52 to the position illustrated. The lever may have a hollow lower portion to receive the spring, which may be wound about the pivot pin 54 of the lever in the usual manner. The base plate 46 does not extend along the full width of the side walls of the housing, but a pair of guide strips 56 fixed to the side walls effectively extend the base plate by providing support for the edge portions of the tongue 18. Plates 58 fixed to the respective side walls have lower edges spaced from the base plate 46 so as to define a passage into which the tongue 18 may be inserted.

The belt passes from the reel 36 over a roller 60 rotatably supported upon the arms 62 of a yoke having a cross bar or bight 64, the lower surface of which is preferably roughened as by knurling. The yoke and roller are part of a slider which is adapted to reciprocate upon the side walls of the receptacle housing by means of projections 66 extending from the arms through corresponding slots 68 in the side walls. It is preferred that the path of reciprocation of the slider be substantially perpendicular to the path of insertion of the tongue 18 into the latch mechanism. It is also desirable that the leading edge (relative to insertion of the tongue) of the lower portion of the cross bar 64 be chamfered or tapered as indicated at 70. The rest position of the slider is such that the slider will be raised upon insertion of the tongue into the receptacle. If the tongue is inserted into the latch mechanism 40, the end of the tongue engages the flight of belt extending between the reel 36 and the roller 60, deflects the belt under the cross bar 64 of the slider, and raises the slider from the position illustrated. The tongue is held in position by the latch mechanism, and any force tending to withdraw further webbing from the reel urges the slider more tightly against the webbing located between the roughened surface of the cross bar and the opposed surface of the tongue. The belt is thus tightly clamped between the cross bar and the tongue and cannot be further extended without first releasing the latch 40 and withdrawing the tongue 18 from the receptacle. When the latch mechanism is released, the tongue may be withdrawn, and the reel 36 will retract the belt without impediment.

To ensure tight clamping of the belt between the slider and the tongue it is important that the belt extend substantially along the direction of movement of the slider after passing from the reel and over the roller 60. However, the orientation of the apparatus as a whole within the receptacle may be varied from that shown in order to provide for convenient insertion of the tongue within the receptacle. Also, as described in the copending Serial No. 344,418, the latch release mechanism may be part of the tongue rather than the receptacle.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein.

What is claimed is:

1. In combination with a vehicle seat, a seat belt outlet disposed at one side of said seat, a seat belt arranged to move through said outlet and having a fastener at an exposed end thereof, releasable means disposed at the opposite side of said seat for retaining said fastener, means for automatically retracting said belt through said outlet when said fastener is released, means operative when said fastener is retained at said opposite side, and independent of the length of belt extended from said retracting means, for restricting extensile movement of said belt through said outlet, and additional means responsive to predetermined increased tension in said belt after operation of said restricting means for clamping said belt at said one side of said seat.

2. In combination with a vehicle seat, a seat belt outlet disposed at one side of said seat, a seat belt trained from the other side of said seat through said outlet for extensile and retractile movement and having a fastener at an exposed end adjacent to said outlet when said belt is retracted, releasable means disposed at said other side for retaining said fastener, means for automatically retracting said belt through said outlet when said fastener is released, means operative in response to the retaining of said fastener, and independent of the length of belt extended from said retracting means, for preventing extensile movement of said belt from said other side, and additional means responsive to predetermined increased tension in said belt after operation of said preventing means for clamping said belt at said one side.

3. The combination of claim 2, said extensile movement-preventing means and said clamping means comprising means for fixing said belt to said seat at the respective sides.

4. In combination, a support, a clamp member mounted for movement toward and away from said support and normally spaced therefrom, a seat belt arranged for extensile and retractile movement between said clamp member and said support, releasable fastener means for retaining said belt in user-restraining position, and means independent of said clamp member, and independent of the length of extended belt in said user-restraining position, for restricting movement of said belt past said support when said belt is in user-restraining position, said clamp member comprising means indenting said belt and responsive to an increased force exerted thereon by said belt after operation of said restricting means for clamping said belt to said support when the belt tension reaches a predetermined value.

5. The combination of claim 4, said clamp member comprising a pivoting belt guide lever.

6. In combination with a vehicle seat, a seat belt outlet at one side of said seat, a receptacle at the other side of said seat, a seat belt retractor, a seat belt extending from said retractor past said receptacle and then through said outlet along a path remote from the seat surface, said belt having a fastener at an exposed end arranged to draw said belt through said outlet and over said surface to said receptacle, releasable means for retaining said fastener in said receptacle, means operative in response to the entrance of said fastener into said receptacle, and independent of the length of belt extended from said outlet, for preventing extensile movement of said belt past said receptacle, and additional means adjacent to said outlet for clamping said belt to said seat in response to an increase in tension in said belt when said fastener is retained in said receptacle and after operation of said preventing means.

7. In a retractable seat belt or the like, a spring-motivated retraction device, a strap having one end connected to said device for extension and retraction and its other end exposed to be grasped for extending said strap from said retraction device in opposition to the force of said spring and past a first location to a second location remote from the first, means at said second location for releasably retaining said other end to place said strap in a user-restraining position with said strap extended from said retraction device any selected length within a wide range of lengths, means operative to restrict further extension of said strap from said retraction device after said strap is in said user-restraining position and independent of the length of strap extended from said retraction device, and additional means for clamping said strap at said first location, only after said extension-restricting means is operated, said additional means comprising a movable strap guide around which said strap is trained for exerting a force on said guide proportional to the strap tension, said guide having a clamp element movable therewith and having means for preventing movement of said guide in response to the force on said guide during extension of said strap from said retraction device to said user-restraining position but permitting said guide to move to clamp said strap after operation of said extension-restricting means upon an increase in strap tension.

References Cited by the Examiner

UNITED STATES PATENTS

| | | | |
|---|---|---|---|
| 885,064 | 4/1908 | Luhmann | 24—170 |
| 2,705,529 | 4/1955 | Bull et al. | 297—386 X |
| 2,947,353 | 8/1960 | Von Wimmersperg | 297—385 |
| 2,971,730 | 2/1961 | Martin | 244—122 |
| 3,128,516 | 4/1964 | Halvarson | 24—170 X |
| 3,147,996 | 9/1964 | Ferrara et al. | 297—388 |
| 3,172,700 | 3/1965 | Haas | 297—388 |
| 3,205,004 | 9/1965 | Spouge | 297—388 |

FRANK B. SHERRY, *Primary Examiner.*

FRANCIS K. ZUGEL, *Examiner.*

R. B. FARLEY, *Assistant Examiner.*